US011148826B2

(12) United States Patent
Juppet et al.

(10) Patent No.: US 11,148,826 B2
(45) Date of Patent: Oct. 19, 2021

(54) METHOD AND APPARATUS FOR CONFIGURING SCREEN DISPLAYS

(71) Applicants: AIRBUS HELICOPTERS, Marignane (FR); AIRBUS HELICOPTERS DEUTSCHLAND GMBH, Donauworth (DE)

(72) Inventors: Valerie Juppet, Vitrolles (FR); Fanny Stutzmann, Salon de Provence (FR); Marie Charbonneau, Chateauneuf les Martigues (FR); Jorrit Van Der Spek, Kiefersfelden (DE); Olga Gonzalez-Valbuena, Ulm (DE)

(73) Assignees: AIRBUS HELICOPTERS, Marignane (FR); AIRBUS HELICOPTERS DEUTSCHLAND GMBH, Donauworth (DE)

(*) Notice: Subject to any disclaimer, the term of this patent is extended or adjusted under 35 U.S.C. 154(b) by 76 days.

(21) Appl. No.: 16/702,781

(22) Filed: Dec. 4, 2019

(65) Prior Publication Data
US 2020/0239157 A1    Jul. 30, 2020

(30) Foreign Application Priority Data

Jan. 24, 2019   (EP) .................................. 19315004

(51) Int. Cl.
*G01C 23/00* (2006.01)
*B64D 43/00* (2006.01)
(Continued)

(52) U.S. Cl.
CPC ............... *B64D 43/00* (2013.01); *G07C 5/06* (2013.01); *G07C 5/0825* (2013.01); *B64D 43/02* (2013.01);
(Continued)

(58) Field of Classification Search
CPC .......... G01D 3/10; G01C 23/00; B64D 43/00; B64D 43/02; G07C 5/06; G07C 5/0825; G06F 3/1423
(Continued)

(56) References Cited

U.S. PATENT DOCUMENTS 6,281,810 B1 * 8/2001 Factor ................... G01C 23/00 340/971
6,803,860 B1 * 10/2004 Langner ................ G01C 23/00 340/971

(Continued)

FOREIGN PATENT DOCUMENTS

| FR | 2892092 A1 | 4/2007 |
|----|------------|--------|
| FR | 2994501 A1 | 2/2014 |
| FR | 3037136 A1 | 12/2016 |

OTHER PUBLICATIONS

Triple-triple redundant 777 primary flight computer YC Yeh—1996 IEEE Aerospace Applications Conference . . . , 1996—ieeexplore.IEEE.org (Year: 1996).*

(Continued)

*Primary Examiner* — Cuong H Nguyen
(74) *Attorney, Agent, or Firm* — Brooks Kushman P.C.

(57) ABSTRACT

Controlling and reconfiguring a display system that includes at least two screens that are installed in a cockpit of an aircraft in case of a failure of one of the screens. For example, a control unit of the display system may detect occurrence of a screen failure. In response to detecting the screen failure, the control unit may determine whether a critical flight relevant information has not been displayed on an operational screen during a predetermined period of time, and in response to determining that the critical flight relevant information has not been displayed on the operational screen during the predetermined period of time, command display of a message on the operational screen that suggests dis-
(Continued)

playing the critical flight relevant information on the operational screen.

20 Claims, 8 Drawing Sheets

(51) Int. Cl.
  *G07C 5/06* (2006.01)
  *G07C 5/08* (2006.01)
  *G01D 3/10* (2006.01)
  *G06F 3/14* (2006.01)
  *B64D 43/02* (2006.01)
(52) U.S. Cl.
  CPC ............... *G01C 23/00* (2013.01); *G01D 3/10* (2013.01); *G06F 3/1423* (2013.01)
(58) Field of Classification Search
  USPC ............... 701/3, 14; 715/771; 340/971, 973
  See application file for complete search history.

(56) References Cited

U.S. PATENT DOCUMENTS

| | | | |
|---|---|---|---|
| 6,832,138 B1 | 12/2004 | Straub et al. | |
| 6,977,666 B1* | 12/2005 | Hedrick | G06F 3/14 345/690 |
| 7,342,512 B2* | 3/2008 | Hedrick | G01C 23/00 340/945 |
| 8,473,176 B2* | 6/2013 | Youngquist | G01K 7/021 701/101 |
| 2008/0062625 A1* | 3/2008 | Batio | G06F 1/1615 361/679.29 |
| 2008/0246633 A1* | 10/2008 | Pouzolz | G01D 3/10 340/971 |
| 2009/0268093 A1* | 10/2009 | Ishihara | H04N 7/18 348/564 |
| 2009/0306839 A1* | 12/2009 | Youngquist | G01K 15/00 701/14 |
| 2010/0019939 A1 | 1/2010 | Alberti et al. | |
| 2010/0097293 A1* | 4/2010 | McMahon | B60K 35/00 345/1.1 |
| 2012/0212499 A1* | 8/2012 | Haddick | G06F 3/017 345/589 |
| 2012/0218301 A1* | 8/2012 | Miller | G02B 27/0172 345/633 |
| 2013/0127980 A1* | 5/2013 | Haddick | G02B 27/0093 348/14.08 |
| 2013/0278631 A1* | 10/2013 | Border | G02C 5/143 345/633 |
| 2015/0123912 A1* | 5/2015 | Nikolic | G06F 3/0416 345/173 |
| 2016/0357492 A1* | 12/2016 | Charbonnier | G09G 5/00 |

OTHER PUBLICATIONS

Designing Control Logic for Cockpit Display Systems using Model-Based Design S Sharma, N Vasi, J Ghidella—AIAA Modeling and Simulation . . . , 2013—arc.aiaa.org (Year: 2013).*

Effects of data-link modality and display redundancy on pilot performance: An attentional perspective JR Helleberg, CD Wickens—The International Journal of Aviation . . . , 2003—Taylor & Francis (Year: 2003).*

Electronic display system for the Swedish JAS39 Gripen aircraft H Brandtberg—IEEE Aerospace and Electronic Systems . . . , 1994—ieeexplore.ieee.org (Year: 1994).*

European Search Report for European Application No. EP 19315004_2, Completed by the European Patent Office, dated Jul. 19, 2019, 7 pages.

* cited by examiner

METHOD AND APPARATUS FOR CONFIGURING SCREEN DISPLAYS

CROSS-REFERENCE TO RELATED APPLICATIONS

This application claims priority to European patent application No. EP 19315004.2 filed on Jan. 24, 2019, the disclosure of which is incorporated in its entirety by reference herein.

BACKGROUND OF THE INVENTION

(1) Field of the Invention

The present embodiments relate to controlling and reconfiguring a display system, and, more particularly, to controlling and reconfiguring a display system that includes at least two screens that are installed in a cockpit of an aircraft in case of a failure of at least one screen of the at least two screens.

(2) Description of Related Art

Modern aircraft often include a system for managing the display in the cockpit of the aircraft. The display system usually has a plurality of screens, as well as a control unit that, is configured to command the display on these screens. In a normal display mode corresponding, in particular, to the absence of screen failure, the control unit is configured to command the display of at least one display window on each of the screens. Each display window is allocated to one or more systems of the aircraft, and it may be of fixed or variable size.

On the occurrence of an event on board the aircraft for which an action by an operator is required (e.g., a warning or an alert), an aircraft computer charged with monitoring the event, e.g. a warning management computer of flight warning system (FWS) type, sends a request to the control unit of the display system in order to display an interactive element in a display window. This display window is sometimes also referred to as an interaction window.

The control unit commands the display of the interaction window comprising the interactive element on one of the screens of the cockpit, at least while an action by an operator is required on the interactive element. Thus, following the occurrence of an event, an operator such as, in particular, a pilot of the aircraft may carry out an action on board the aircraft by acting on the interactive element by a human-machine interface in the cockpit. This action corresponds, for example, to an acknowledgment of a warning or to a modification in the state of a system of the aircraft (e.g., the shutdown of an engine, the opening or closing of a valve, etc.).

The interactive element often has a button displayed in the interaction window that the operator may press. Generally, the interaction window also includes one or more indicators allowing the operator to understand the nature of the event.

In the event of failure of one or more screens of the cockpit, the control unit commands the display on the other, functioning, screens according to a reconfigured display mode.

Document FR 2 892 092 A1 describes such a display mode. When a non-functioning screen corresponds to a screen on which, in the normal display mode, a display window that is considered to have priority is displayed, then the display is manually modified in such a way that the display window is displayed on another, functioning, screen instead of a display window that has lower priority. A human-machine interface, such as a push-button, that is connected to the control unit of the display system allows the pilot to view, on this other screen, one or more other display windows. Thus, each press by the pilot on this push-button allows the display window displayed on this other screen to be changed, according to a predefined order. The pilot may thus scroll through and view all of the display windows that are normally displayed on the various screens of the cockpit in the normal display mode.

The activation of the reconfigured display mode may also correspond, aside from in the event of failure of a screen, to a voluntary request by the pilot to display, on one of the screens of the cockpit, a display window that is normally displayed on a portable device of Electronic Flight Bag (EFB) type. The corresponding display window is then displayed instead of a display window that is normally displayed on this screen of the cockpit in the normal display mode.

When the display is carried out according to the reconfigured display mode, the interactive element that is displayed in the interaction window may not be accessible to a pilot of the aircraft if the interaction window is not displayed on a screen of the cockpit due to the reconfiguration of the display. Indicators are given in the cockpit so as to warn the pilot of the occurrence of the event, generally in the form of a visual and/or acoustic indicator: the pilot must then act on the human-machine interface in order to view the interaction window.

If the event occurs at a moment when the pilot's workload is high, the pilot may wish to carry out the actions that are related to this event at a later time. Therefore, the pilot may be given the option to dismiss the visual or acoustic indicator that is related to the event in order not to be disturbed by the visual or acoustic indicator while he or she carries out other actions. As a result, he or she must then memorize the fact that he or she received this visual or acoustic indicator so as not to forget to request the display of the interaction window at a later time.

Additionally, the display of the interaction window may require multiple actions by the pilot on the human-machine interface in order to scroll through multiple windows until the interaction window is displayed and, moreover, the pilot may not know in advance how many actions will be required on this human-machine interface so that the interaction window is displayed on a screen of the cockpit.

Sometimes, the pilot may even skip over the interaction window when he or she scrolls through these multiple windows, for example due to a sensitive human-machine interface that registers two actions instead of one action of the pilot or due to a slow response of the human-machine interface which may prompt the pilot to actuate the human-machine interface too often.

Specifically, as pointed out above, the various display windows that are able to be viewed on a screen in reconfigured display mode are often displayed according to a predefined order during the successive actions by the pilot on the human-machine interface, but the pilot may not know this predefined order, especially as this may depend on the number of non-functioning screens in the cockpit and the position of the non-functioning screen(s).

The successive actions on the human-machine interface generate an additional workload for the pilot, especially as the pilot must additionally watch out for the appearance of the interaction window on the display, especially if he or she does not know in advance, on the one hand, how many actions are required on the human-machine interface in order to obtain the display of the interaction window and, on the other hand, on which screen the interaction window will be displayed.

Document U.S. Pat. No. 6,832,138 B1 describes systems and methods for integrated control, access, and presentation of flight information within the cockpit. Cockpit instrument systems and methods are provided which include a first cockpit instrument panel which has a first display proximately located to a first bezel. The first display is operable to present navigational data, communication data, and flight information data including airspeed, attitude, and altitude. The systems and methods further include a second cockpit instrument panel located adjacent to the first cockpit instrument panel. The second cockpit instrument panel has a second display proximately located to a second bezel. The second display is operable to present navigational data, communication data, and flight information data including detailed engine parameters. When either the first or the second cockpit instrument panel fails, the remaining functional, first or second display, is adapted to provide all of the important flight information data, including airspeed, attitude, altitude, and detailed engine parameters.

Document US 2008/0246633 A1 describes A display system for an aircraft that includes a plurality of screens (E1 to En) each of which is formed so as to be able to display an image, and a particular image being associated with each of said screens (E1 to En), detection means for detecting any failure of one of said screens (E1 to En), and automatic reconfiguration means intended, upon the detection of a failure of at least one screen by said detection means: to automatically check if the image which is associated with said failed screen has priority over at least one other image associated with another screen, based on at least one set of predetermined priority rules, and when the image which is associated with said failed screen has priority, to display this image on a valid screen with which there is associated an image which has a lower priority according to said set of priority rules, wherein said automatic reconfiguration means comprise a plurality of auxiliary means (B1 to Bn), each of which is associated with one of said screens (E1 to En) and for this purpose comprises a status table for the associated screen which indicates the image that said associated screen should display automatically as a function of a validity status of at least some of the other screens and as a function of said set of priority rules.

Document US 2010/0019939 A1 describes a display system for an aircraft that includes a head-up viewing device, which presents, on a head-up display means, superimposed with the environment seen in front of the aircraft, a primary display comprising at least primary piloting information for the aircraft; and a head-down viewing device which comprises a plurality of head-down screens (E1, E2, E3) presenting specific displays relating to the flight of the aircraft, which furthermore includes detection means for automatically detecting a defect in the primary display implemented by said head-up viewing device and for emitting, as appropriate, at least one corresponding signal; and reconfiguration means for receiving any signal emitted by said detection means and for automatically reconfiguring said head-down viewing device upon receipt of such a signal in such a way as to modify the display of at least one first of said head-down screens (E1 to E3) so that this first head-down screen presents, in place of its specific display, an auxiliary display comprising at least said primary piloting information which is presumed presented on said head-up display means.

Documents ER 3 037 136 B1 and US 2016/0357492 A1 describe a display system and method including screens in a cockpit of an aircraft. A control unit is configured to command the display according to a normal display mode, wherein the control unit is configured so as to command the display such that subsequent to the occurrence of an event on board the aircraft leading to the display of an interactive element in an interaction window, the control unit commands the display of the interaction window on one of the screens at least while an action by an operator is required on the interactive element, and a reconfigured display mode, wherein the control unit is configured to command the display, on a second screen including a signaling area, of a display window that is normally displayed on a first screen in the normal display mode, and to command the display of an indicator in the signaling area if the interaction window is not displayed on a screen of the screens when an action by an operator is required on the interactive element.

It should be noted that the display systems generally do not provide the option to select display of nan-critical flight relevant information. Instead, in the event of a screen failure, the display system commands the immediate display of critical flight relevant information on at least one of the still operational screens, especially if the failing screen previously displayed such critical, flight relevant information before the failure.

Moreover, some flight modes such as an automatic flight control system (AFCS), a flight management system (FMS), a very high frequency (VHF) omni-directional range system (VOR), or an instrument landing system (ILS) require, when armed, display of related flight relevant information on a screen and may be disarmed if the corresponding flight relevant information is not displayed.

Furthermore, most display systems are expensive and require the installation of a large number of equipment leading to a large and often confusing dashboard in the cockpit.

Thus, in summary, display systems in aircrafts usually include multiple screens and a complex control unit, which may be expensive while still providing a restrictive use model in case of a failure of one or more of the multiple screens.

BRIEF SUMMARY OF THE INVENTION

It is, therefore, an objective to provide a new method for operating, in an aircraft, a simplified and more versatile display system. The new display system and the method for operating the latter should be straightforward to use and provide a reduction in cost compared to conventional display systems.

This objective is solved by a new method for operating a display system in an aircraft, which comprises the features of claim 1. More specifically, a method for operating, in an aircraft, a display system that comprises at least a first and a second screen that are installed in a cockpit of the aircraft and a control unit, may perform the operations of using the control unit to monitor the at least first and second screens and control display of the flight, relevant information on the at least first and second screens in a first mode and in a second mode, wherein in the first mode the first and second screens are operational; if failure of the first screen occurs, detecting occurrence of the failure of the first screen with the control unit; in response to detecting occurrence of the failure of the first screen, entering the second mode with the control unit; in the second mode, determining with the control unit whether a critical flight relevant information of the flight relevant information has not been displayed on the second screen during a predetermined period of time; and in response to determining with the control unit that the critical flight relevant information has not been displayed on the second screen during the predetermined period of time, using the control unit to command display of a message on the second screen that suggests displaying the critical flight relevant information on the second screen.

According to some aspects, the display system may, in case of the failure of one of the screens, display a message that invites the operator of the aircraft to manually switch between different displays on the operational screens. If desired, the message may be displayed after a predetermined period of time. For example, a countdown stopwatch may count for a predetermined period of time and display a corresponding message on one of the operational screens.

According to some aspects, the display system may, in case of the failure of one of the screens, display automatically critical flight relevant information based on the detection of predetermined events.

According to some aspects, when Information related to an armed or coupled predetermined navigation mode is not displayed on an operational screen, a timer may be launched to display the information related to the armed or coupled predetermined navigation mode on one of the operational screens before the corresponding flight mode is disarmed or decoupled.

If desired, another timer may be launched to display a message that invites the operator of the aircraft to switch to displaying the information related to the armed or coupled predetermined navigation mode on one of the remaining operational screens before the display system commands display of the information related to the armed or coupled predetermined navigation mode.

According to some aspects, one of the remaining operational screens may automatically display the information related to the armed or coupled predetermined navigation mode before disarmament or decoupling of the corresponding flight mode.

According to some aspects, the new method may reduce the number of screens in the cockpit of the aircraft, thereby reducing the size of the dashboard.

According to some aspects, a harmonized human-machine interface between different screen configurations and dashboards may facilitate the interaction of the pilot with different aircrafts that are all equipped with different dashboards and screen configurations, but with the same harmonized human-machine interface.

According to some aspects, the human-machine interface may enable certification in a single-pilot instrument flight rules configuration with two screens.

According to one aspect, only the second screen is operational and all other screens of the at least first and second screens are non-operational.

According to one aspect, the method may further include the operation of in response to entering the second mode with the control unit, using the control unit to automatically command display of the critical flight relevant information on the second screen.

According to one aspect, determining whether the critical flight relevant information has not been displayed on the second screen during the predetermined period of time may further include initializing a timer.

According to one aspect, the method may further include the operations of running the timer for the predetermined period of time and, during the predetermined period of time, detecting whether the control unit has returned to the first mode or whether the critical flight relevant information has been displayed on a screen of the at least first and second screens, and upon expiry of the predetermined period of time and in response to detecting that the control unit has not returned to the first mode and that the critical flight relevant information has not been displayed on a screen of the at least first and second screens, generating a status signal indicating that the critical flight relevant information has not been displayed during the predetermined period of time.

According to one aspect, the method may further include the operations of running the timer, determining that the control unit is no longer in the second mode or that the critical flight relevant information has already been displayed on a screen of the at least first and second screens, before the timer has run for the predetermined period of time, and generating a status signal indicating that the critical flight relevant information has been displayed on the second screen during the predetermined period of time.

According to one aspect, the method may further include the operations of with the control unit, receiving an alert signal indicating an occurrence of a flight safety-critical event, and in response to receiving the alert signal, displaying information related to the flight safety-critical event on the second screen.

According to one aspect, the flight safety-critical event includes at least one of a first event that represents an immediate hazard to the safe operation of the aircraft or a second event that represents a potential future hazard to the safe operation of the aircraft.

According to one aspect, the method may further include the operations of with the control unit, receiving an information signal indicating an armed or coupled predetermined navigation mode, determining whether information related to the armed or coupled predetermined navigation mode has not been displayed on the second screen during another predetermined period of time, and in response to determining that the information related to the armed or coupled predetermined navigation mode has not been displayed on the second screen during the other predetermined period of time, using the control unit to command display of the information related to the armed or coupled predetermined navigation mode on the second screen.

According to one aspect, the armed or coupled predetermined navigation mode comprises at least one of an armed or coupled automatic flight control system, an armed or coupled flight management system, an armed or coupled very high frequency omni-directional range system, or an armed or coupled instrument landing system.

According to one aspect, determining whether the information related to the armed or coupled predetermined navigation mode has not been displayed on the second screen during the other predetermined period of time further includes initializing an additional timer.

According to one aspect, the method may further include the operations of running the additional timer for the other predetermined period of time and, during the other predetermined period of time, detecting whether the information related to the armed or coupled predetermined navigation mode has been displayed on a screen of the at least first and second screens; upon expiry of the other predetermined period of time and in response to detecting that the information related to the armed or coupled predetermined navigation mode has not been displayed on a screen of the at least first and second screens, generating a status signal indicating that the information related to the armed or coupled predetermined navigation mode has not been displayed during the other predetermined period of time; and in response to receiving the status signal with the control unit, using the control unit to automatically command display of the information related to the armed or coupled predetermined navigation mode on the second screen.

According to one aspect, the method may further include the operations of running the additional timer, determining that the information related to the armed or coupled predetermined navigation mode has already been displayed on a screen of the at least first and second screens, before the additional timer has run for the other predetermined period of time, and generating a statue signal indicating that the information related to the armed or coupled predetermined navigation mode has been displayed on the second screen during the predetermined period of time.

According to one aspect, the method may further include commanding display of information related to either one of two redundant instrument landing systems on the second screen.

Furthermore, a display system in an aircraft adapted to perform the method mentioned-above may include at least a first and a second screen and a control unit. The at least first and second screens may be installed in a cockpit of the aircraft. The control unit may monitor the at least first and second screens and control display of the flight relevant information on the at least first and second screens in a first mode and in a second mode, wherein in the first mode the first and second screens are operational, and wherein the control unit enters the second mode upon detecting occurrence of a failure of the first screen, characterised in that in the second mode, the control unit commands the second screen to display a message that suggests a switch from displaying a first non-critical flight relevant information of the flight relevant information on the second screen to displaying a first critical flight relevant information of the flight relevant information on the second screen, if the first critical flight relevant information has not been displayed on the second screen during a predetermined period of time.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once, in the following description.

DETAILED DESCRIPTION OF THE INVENTION

Exemplary embodiments may be included in any aircraft with a cockpit in which a multi-screen display system is installed, and in which the multi-screen display system provides information that is relevant for the operation of the aircraft.

Figure 1:
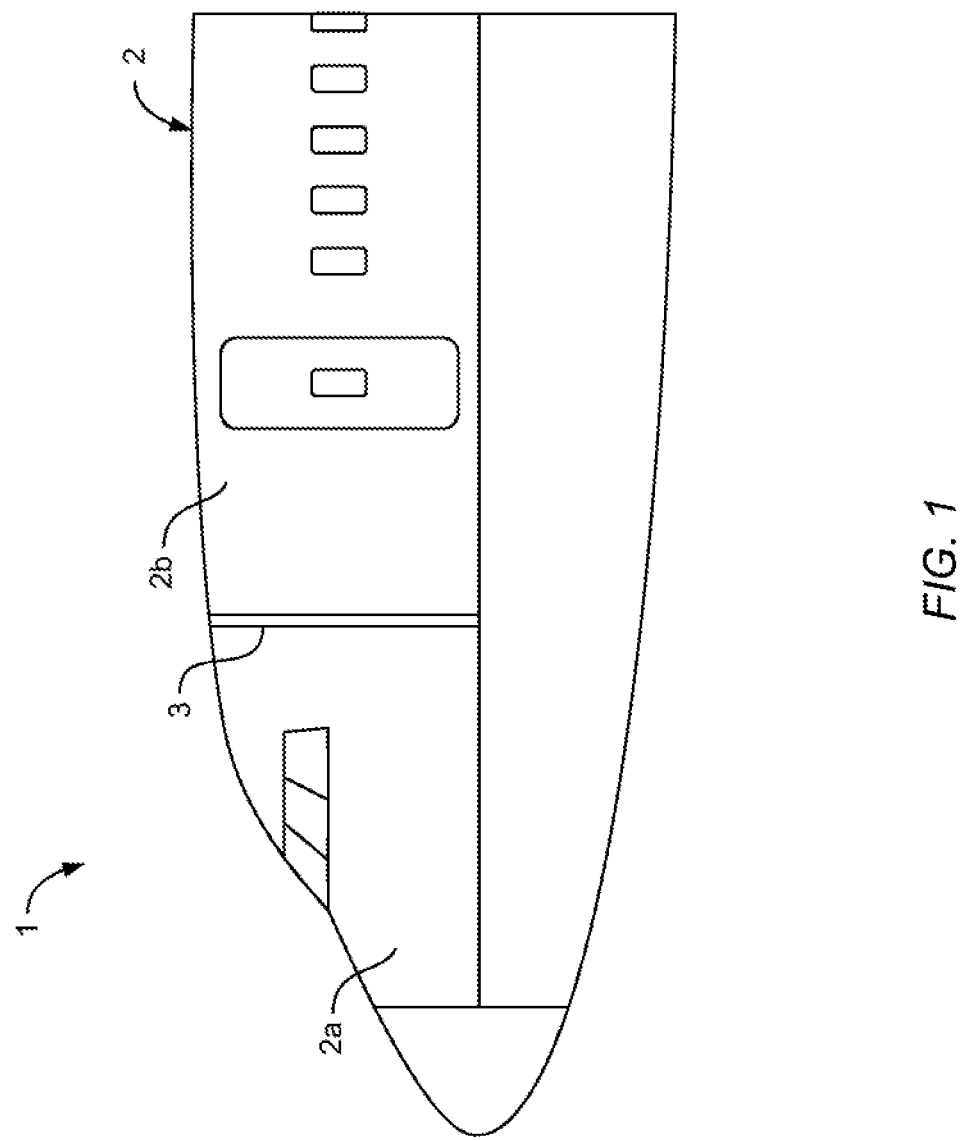
FIG. 1 is a diagram of an illustrative aircraft with a cockpit in accordance with some embodiments.

FIG. 1 shows an example of an aircraft 1. An aircraft may be an airplane, a multicopter, a helicopter, or any other flying vehicle with a cockpit in which a multi-screen display system is installed. As shown in FIG. 1, aircraft 1 may be an airplane.

Aircraft 1 is exemplarily embodied with fuselage 2 that includes compartments 2a and 2b. In some embodiments, compartments 2a, 2b may include the cockpit, the cabin, the cargo compartment, etc. If desired, compartments 2a, 2b may be spatially separated, for example, by a wall or a door 3. Cockpit 2a of aircraft 1 may have a display system. The display system may have a control unit and at least two screens that are installed in cockpit 2a.

Figure 2:
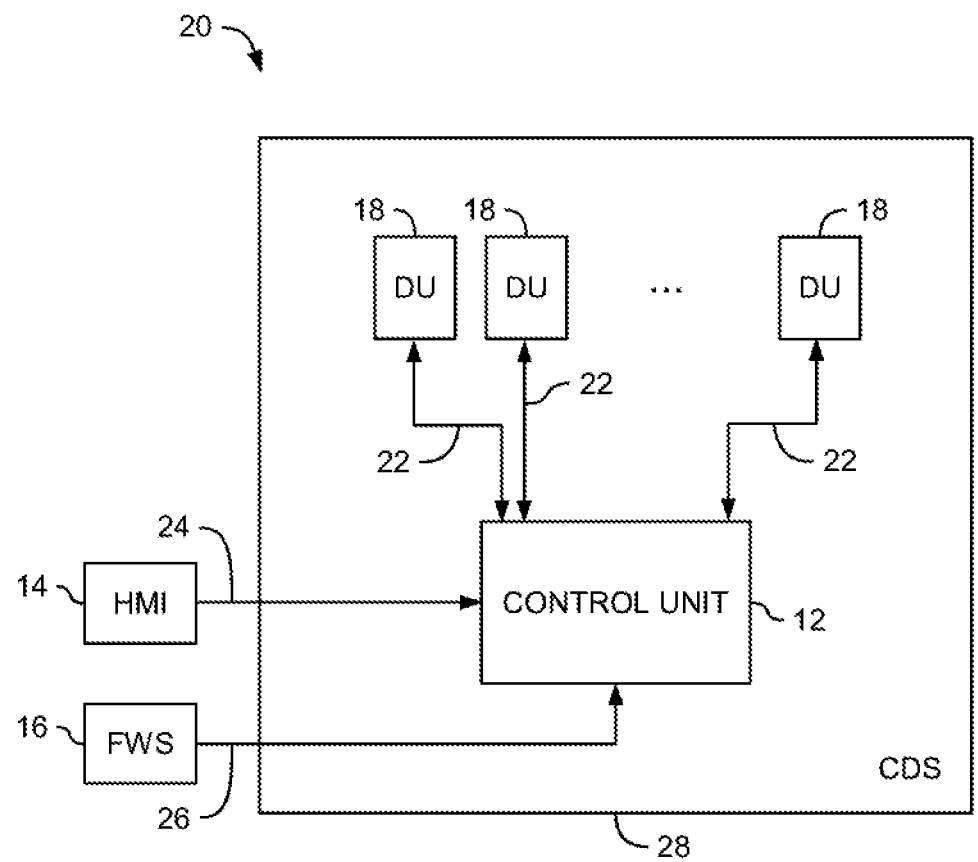
FIG. 2 is a diagram of an illustrative display system in accordance with some embodiments.

FIG. 2 shows illustrative display system 20 in accordance with some embodiments. Display system 20 may include display management system 28, human-machine interface (HMI) 14, and a warning management system of flight warning system (FWS) type 16.

Display management system 28 may include control unit 12 and a plurality of display screens 18, which are sometimes also referred to as display units (DU) 18 or screens 18. In particular, display management system 28 may include at least a first and a second screen 18. Screens 18 may be located in the cockpit of an aircraft (e.g., in cockpit 2a of aircraft 1 of FIG. 1). If desired, connections 22 may connect screens 18 to control unit 12.

In some embodiments, connection 24 may connect control unit 12 with human-machine interface (HMI) 14. Various variants are possible for human-machine interface 14. Human-machine interface 14 may, for example, include a push-button, a joystick, a pointing device such as a trackball, a touchscreen, etc. or any combination thereof.

If desired, control unit 12 may be connected to a set of avionics computers. For example, connection 26 may connect control unit 12 to warning management system of flight warning system (FWS) type 16.

In operation, control unit 12 may command the display on screens 18 according to information that it receives, in particular from the avionics computers including warning management system 16, and according to interactions with members of the aircraft's crew on the human-machine interface 14.

In some embodiments, control unit 12 may monitor the proper operation of screens 18 via connections 22. For example, control unit 12 may monitor the at least first and second screens 18 and control display of flight relevant information on the at least first and second screens 18 in a first mode and in a second mode, wherein in the first mode the first and second screens 18 are operational.

If desired, control unit 12 may be able to detect failure of one or more screens 18. To this end, control unit 12 may be configured to receive information about the state of screens 18 via connections 22 and to detect failure of a screen 13 according to the state information.

In the absence of screen failure, control unit 12 may command the display on screens 18 according to the first mode, which is sometimes also referred to as "normal display mode". In the event of failure of at least one screen of screens 18, the control unit 12 may command the display on another, functioning, screen of screens 18 according to the second mode, which is sometimes also referred to as "reconfigured display mode".

As an example, consider the scenario in which control unit 12 operates in the first mode. Consider further that failure of a first screen 18 occurs. In this scenario, control unit 12 may detect occurrence of the failure of the first screen 18. In response to detecting occurrence of the failure of the first screen, control unit 12 may enter the second mode.

In the normal display mode, control unit 12 may command the display of at least one display window on each screen 18. In some embodiments, screen 18 may include more than one display area. For example, screen 18 may include a first and a second display area. In this example, control unit 12 may commands the display of at least one display window in the first display area and the display of at least one other display window in the second display area.

A display window may include any display that locally regroups information on a screen. Optionally, the display window may be delimited by a frame.

When the warning management system 16 detects the occurrence of an event on board the aircraft, if the flight procedures dictate that this event must be signaled to the members of the aircraft's crew and requires an action on the part of a crew member, then the warning management system 16 sends information relating to this event to the control unit 12 via the connection 26. The control unit 12 then commands the display of an interactive element in an interaction window and it commands the display of the interaction window on one of the screens 18, at least while an action by an operator is required on the interactive element.

Thus, a crew member, such as a pilot of the aircraft, may use the human-machine interface 14 in order to act on the interactive element so as to carry out the required action. As the interaction window is displayed on one of screens 18, the pilot may act on the interactive element in this window subsequent to the occurrence of an event, without having to carry out any action to bring about the display of the interaction window.

In the reconfigured display mode, control unit 12 may be configured to command on an operational screen 18 (e.g., a second screen) the display of a display window that is normally displayed on the no longer operational screen 18 (e.g., a first screen) in the normal display mode. This display window is then displayed on the second screen instead of another display window that is displayed on the second screen in normal display mode.

According to one embodiment, control unit 12 may automatically command the display of the display window on the second screen following the failure of the first screen. For example, the display window may be parameterized in control unit 12 as having priority with respect to the other display window that is displayed on the second screen in normal display mode.

According to one embodiment, control unit 12 may command the display of the display window on the second screen following an action by an operator on human-machine interface 14 after the failure of the first screen. For example, the display window may be parameterized in the control unit 12 as having lower priority with respect to the other display window that is displayed on the second screen in normal display mode.

As an example, the display windows of Engine Display (ED), System Display (SD), MailBox (MB), Warning Display (WD), and Multi-Function Display (MFD) types may be parameterized in control unit 12 as having a lower priority, and the display windows of Flight and Navigation Display (FND), Vertical Display (VD), Primary Flight Display (PFD), Slat Flaps and Trim Indicator (SFT), Instrument Landing System (ILS), Automatic Flight Control System (AFCS), Flight Management System (FMS), Very High Frequency (VHF) Omni-Directional Range (VOR) types may be parameterized in control unit 12 as having higher priority.

The display windows of display types that are parameterized in control unit 12 as having lower priority are sometimes associated with non-critical flight relevant information, while the display windows of display types that are parameterized in control unit 12 as having higher priority are sometimes associated with critical flight relevant information.

When control unit 12 receives, via connection 24, information originating from human-machine interface 14 relating to an action by an operator on human-machine interface 14, the control unit 12 may command a change of the display window displayed on the second screen.

For example, consider the scenario in which control unit 12 is in the reconfigured display mode, and a display window of a type having a higher priority parameter in control unit 12 (e.g., a display window of ND and/or VD type) is displayed on the second screen before an action by the operator on human-machine interface 14. Consider further that the effect of an action on human-machine interface 14 replaces the display window of the type having the higher priority parameter in control unit 12 with another display window of a type having a lower priority parameter in control unit 12 (e.g., a display window of ED and/or SD type).

In other words, the second screen displays a display window that is associated with critical flight relevant information and the effect of an action on human-machine interface 14 replaces the display window that is associated with critical flight relevant information with a display window that is associated with non-critical flight relevant information.

In this scenario, control unit 12 may determine that the critical flight relevant information is no longer displayed on the second screen. If desired, control unit 12 may be configured to allow that critical flight relevant information is not being displayed on the second screen for a predetermined period of time.

Thus, control unit 12 may initialize a timer in response to detecting that the critical flight relevant information has not been displayed on the second screen. Control unit 12 may run the timer for the predetermined period of time and, during the predetermined period of time, detect whether control unit 12 has returned to the normal display mode or whether the critical flight relevant information has been displayed on the second screen.

Upon expiry of the predetermined period of time and in response to detecting that control unit 12 has not returned to the normal display mode and that the critical flight relevant information has not been displayed on the second screen, control unit 12 may generate a status signal indicating that the critical flight relevant information has not been displayed during the predetermined period of time.

In response to the status signal, control unit 12 may command display of a message on the second screen that suggests displaying the critical flight relevant information on the second screen. The message may be designed to draw the attention of the operator. For example, control unit 12 may display any combination of a display window with a different color than the remainder of the screen, a display window that flashes, a display window with text that blinks, a display window that is placed in the center of the screen or in any other highly visible area, etc.

The operator, in particular a pilot of the aircraft, is thereby informed that he or she should change the display window on the second screen from displaying non-critical flight relevant information to displaying critical flight relevant information. For example, an action by the operator on the human-machine interface 14 may then direct control unit 12 to command display of the display window with the critical flight relevant information on the second screen, instead of the display window with the non-critical flight relevant information.

In some scenarios, control unit 12 may determine that the control unit 12 is no longer in the reconfigured display mode or that the critical flight relevant information has already been displayed on the second screen, before the timer has run for the predetermined period of time.

Thus, control unit 12 may generate a status signal indicating that the critical flight relevant Information has been displayed on the second screen during the predetermined period of time. In response to the status signal, control unit 12 may restrain from commanding display of a message on the second screen.

As another example, consider the scenario in which control unit 12 is in the reconfigured display mode with a first screen being non-operational and a second screen being operational. Consider further that control unit 12 receives an information signal (e.g., from warning management system 16 via connection 26) indicating an armed or coupled predetermined navigation mode. For example, control unit 12 may receive an information signal indicating that the automatic flight control system (AFCS), the flight management system (FMS), the VHF omni-directional range (VOR), the instrument landing system (ILS), and/or any other predetermined navigation mode is armed (i.e., turned on) and/or coupled (i.e., in connection with a device that is not on board the aircraft, such as a terrestrial antenna).

In such a scenario, flight regulations may require that a display window associated with the predetermined navigation mode displays information related to the armed or coupled predetermined navigation mode. Consider further that the effect of an action on human-machine interface 14 replaces the display window associated with the predetermined navigation mode with another display window of a type having a lower priority parameter in control unit 12 (e.g., a display window of ED and/or SD type).

In other words, the second screen displays a display window that is associated with the predetermined navigation mode and the effect of an action on human-machine interface 14 replaces the display window that is associated with the predetermined navigation mode with a display window that is associated with non-critical flight relevant information.

In this scenario, control unit 12 may determine that the information that is associated with the armed or coupled predetermined navigation mode is no longer displayed on the second screen. If desired, control unit 12 may be configured to allow that the information that is associated with the armed or coupled predetermined navigation mode is not being displayed on the second screen for a predetermined period of time before the armed or coupled predetermined navigation mode needs to be disarmed and/or decoupled.

For example, control unit 12 may initialise a timer, run the timer for a first predetermined period of time, which may be shorter than a second predetermined period of time, upon expiry of which, the armed or coupled predetermined navigation mode needs to be disarmed and/or decoupled. Control unit 12 may, during the first predetermined period of time, detect whether the information related to the armed or coupled predetermined navigation mode has been displayed on the second screen. Upon expiry of the first predetermined period of time and in response to detecting that the information related to the armed or coupled predetermined navigation mode has not been displayed on the second screen, control unit 12 may generate a status signal indicating that the information related to the armed or coupled predetermined navigation mode has not been displayed during the first predetermined period of time.

In response to determining that the information related to the armed or coupled predetermined navigation mode has not been displayed on the second screen during the first; predetermined period of time (e.g., based on the status signal), control unit 12 may command display of the information related to the armed or coupled predetermined navigation mode on the second screen.

In other words, before expiry of the period of time before the armed or coupled predetermined navigation mode needs to be disarmed and/or decoupled, control unit 12 may automatically command display of the information related to the armed or coupled predetermined navigation mode on the second screen, thereby overriding the operator's choice of displaying a display window that is associated with non-critical flight relevant information and avoiding disarmament and/or decoupling of the predetermined navigation mode.

As another example, control unit 12 may initialize a timer, run the timer, and determine that the information related to the armed or coupled predetermined navigation mode has already been displayed on the second screen before expiry of the first predetermined period of time.

If desired, control unit 12 may generate a status signal indicating that the information related to the armed or coupled predetermined navigation mode has been displayed on the second screen during the first predetermined period of time. In response to the status signal, control unit 12 may restrain from commanding a change of display windows on the second screen.

In some scenarios, flight regulations may require the monitoring of redundant information on different screens of a display system. For example, flight regulations may require that information related to a first of two redundant instrument landing systems (ILS) is monitored on a first screen and that information related to a second of the two redundant instrument landing systems is monitored on a second screen.

In some embodiments, when control unit 12 is operating in the reconfigured display mode with the first screen being non-operational and the second screen being operational, control unit 12 may command display of information related to either one of two redundant instrument landing systems (ILS) on the second screen.

In some embodiments, control unit 12 may command display of information related to either one of two redundant instrument landing systems (ILS) on either one of the first and second screens when control unit 12 is operating in the normal display mode and both screens are operational.

In some embodiments, control unit 12 may receive an alert signal. For example, control unit 12 may receive an alert signal from warning management system 16 via connection 26. The alert signal may indicate an occurrence of a flight safety-critical event. For example, the flight safety-critical event may include one or more events that represent an immediate hazard to the safe operation of the aircraft and/or one or more events that represent a potential future hazard to the safe operation of the aircraft.

In response to receiving the alert signal, control unit 12 may command display of information related to the flight safety-critical event on the second screen. For example, control unit 12 may display the information related to the flight safety-critical event in form of any combination of a display window with a different color than the remainder of the screen, a display window that flashes, a display window with text that blinks, a display window that is placed in the center of the screen or in any other highly visible area, etc.

In some embodiments, display attributes of the information related to the flight safety-critical event, such as its color or the display type (fixed or flashing, etc.) may depend on the importance of the event parameterized in the control unit 12. For example, the indicator may be displayed in red for the most important events and in yellow for less important events.

In some embodiments, the plurality of display screens 13 of display system 20 may include at least a first and a second screen 18. According to one embodiment, at least the second screen may include display surface 30 in which the display is shared between display area 31 and signaling area 35, as shown in FIG. 3A.

Figure 3A:
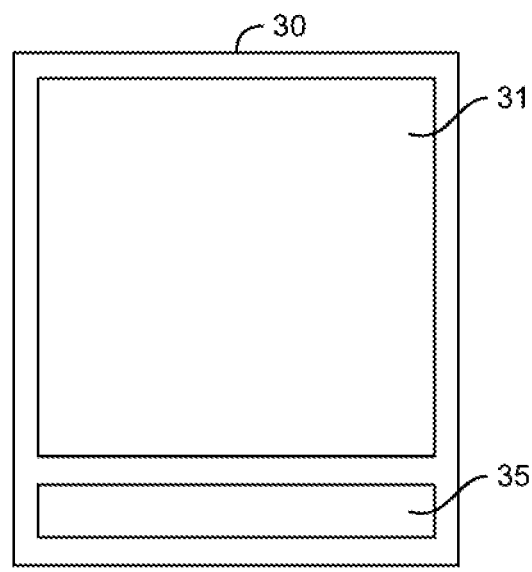
FIG. 3A is a diagram of an illustrative screen of a display system in accordance with some embodiments.

As shown in FIG. 3A, display area 31 may be arranged above signaling area 35. However, display area 31 and signaling area 35 may be arranged differently on display surface 30. For example, display area 31 may be arranged left of signaling area 35, right of signaling area 35, below signaling area 35, etc. In some embodiments, display area 31 may be split info left and right display areas and signaling area 35 may be arranged between the left and right display areas.

As an example, subsequent to the occurrence of a flight safety-critical event on board the aircraft, control unit 12 may display the information related to the flight safety-critical event on the second screen by commanding the display of an indicator in signaling area 35 of display surface 30.

The operator may then take note of the occurrence of a flight safety-critical event and carry out the required action by acting on the human-machine interface 14, if desired. The action may include, for example, an acknowledgment of a warning or a modification in the state of a system of the aircraft (e.g., the shutdown of an engine, the opening or closing of a valve, etc.).

In some embodiments, signaling area 35 may include an interactive element that is actionable using the human-machine interface. For example, when the human-machine interface corresponds to a pointing device, the interactive element may correspond to a portion of the signaling area in which an operator may click. As another example, when the human-machine interface corresponds to a touchscreen, the interactive element may correspond to a sensitive surface of the touchscreen, this sensitive surface being defined in the signaling area.

Figure 3B:
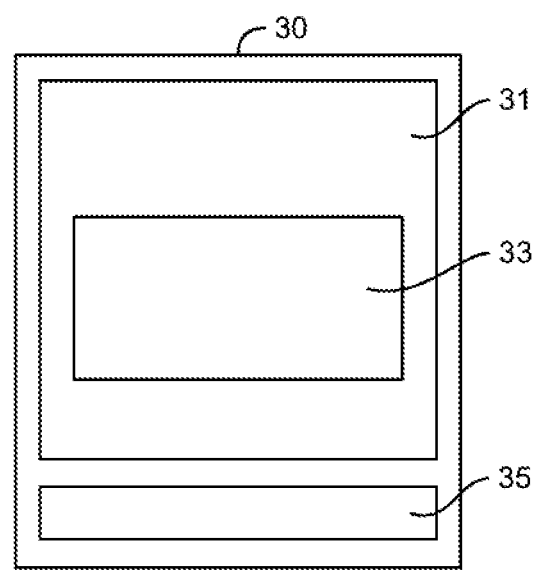
FIG. 3B is a diagram of an illustrative screen of a display system showing a message in accordance with some embodiments.

FIG. 3B shows a screen with display surface 30 on which display area 31 may be arranged above signaling area 35. If desired, display area 31 and signaling area 35 may be arranged differently on display surface 30. For example, display area 31 may be arranged left of signaling area 35, right of signaling area 35, below signaling area 35, etc. In some embodiments, display area 31 may be split into left and right display areas and signaling area 35 may be arranged between the left and right display areas.

As shown in FIG. 3B, display area 31 may include message area 33. If desired, message, area 33 may be arranged differently on display area 31. For example, message area 33 may be placed on top, on the bottom, in the center, on the right, on the left, or in a corner of display area 31, just to name a few alternatives.

If desired, message area 33 may take more or less space on display area 31. As an example, message area 33 may cover the entire display area 31. As another, example, message area 33 may cover only a small portion of display area 31. In some embodiments, message area 33 may be placed inside signaling area 35.

As an example, message area 33 may display the message that suggests displaying critical flight relevant, information on the second screen. In some embodiments, signaling area 35 may display the message that suggests displaying critical flight relevant information on the second screen. If desired, message area 33 and signaling area 35 may both display the message that suggests displaying critical flight relevant information on the second screen. If desired, message area 33 and/or signaling area 35 may display the information related to a flight safety-critical event after occurrence of such an event.

Message area 33 and/or signaling area 35 may display the message and/or the information related to the flight safety-critical event so as to draw the attention of the operator. For example, message area 33 may have a different color than the remainder of the screen, may flash or blink, may include text that blinks, etc.

Figure 4A:
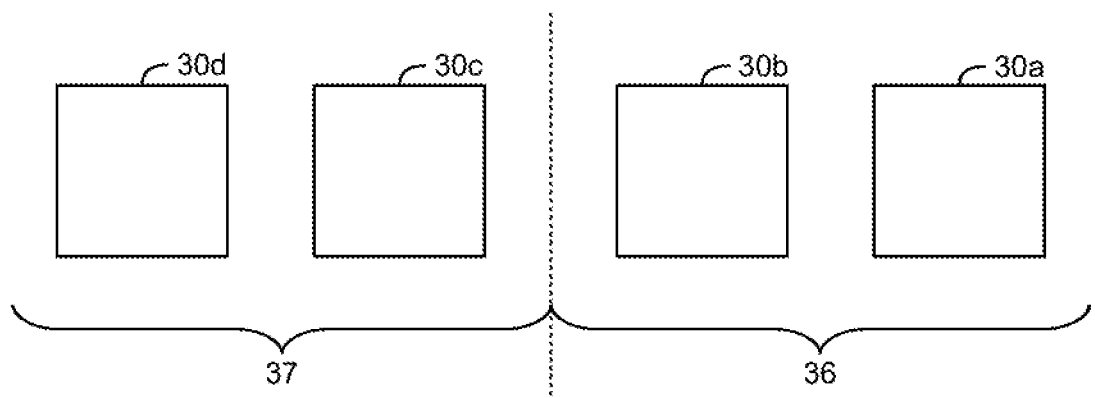
FIG. 4A is a diagram of an illustrative display system with two screens at a left, crew station and two screens at a right crew station in accordance with some embodiments.
Figure 4B:
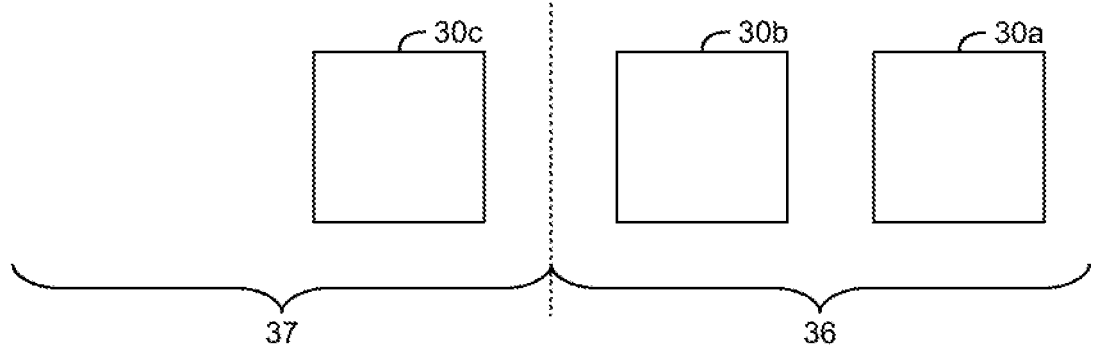
FIG. 4B is a diagram of an illustrative display system with one screen at a left crew station and two screens at a right crew station in accordance with some embodiments.
Figure 4C:
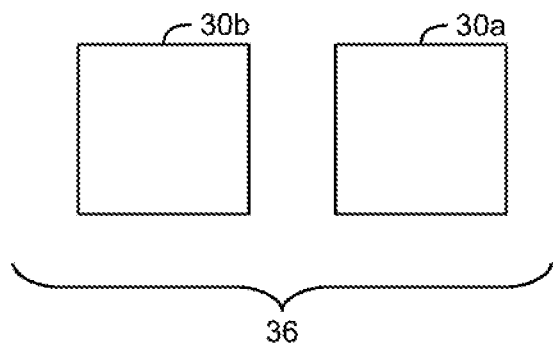
FIG. 4C is a diagram of an illustrative display system with two screens for a single pilot configuration in accordance with some embodiments.

FIGS. 4A, 4B, and 4C show different display screen arrangements that may be installed in a cockpit of an aircraft. In some embodiments, a display system may include a single screen with different display surfaces that are controlled individually by a control unit (e.g., control unit 12 of FIG. 2 that controls several display units that all may be on the same screen).

If desired, every display surface may be on a separate screen. In some embodiments, two or more display surfaces may be grouped on one screen. For example, two screens may be installed in the cockpit, and every screen of the two screens may have two display surfaces for a total of four display surfaces.

However, for simplicity and clarity, we assume that one screen has one display surface. In other words, different display surfaces are on separate screens or each screen has exactly one display surface. Thus, as shown in FIGS. 4A, 4B, and 4C, each display system may include at least a first screen and a second screen.

For example, FIG. 4A shows a right crew station 36 with two screens 30a, 30b and a left crew station 37 with two screens 30c, 30d. FIG. 4B shows a right crew station 36 with two screens 30a, 30b and a left crew station 37 with one screen 30c, and FIG. 4C shows a right crew station 36 with two screens 30a, 30b.

During normal operation, all screens 30 are operational and connected to a control unit (e.g., via connections 22 to control unit 12 of FIG. 2). The control unit may monitor screens 30 and have two different modes. The control unit may be in a first mode or normal display mode when all screens 30 are operational.

If failure of a first screen of screens 30 occurs, the control unit may detect the occurrence of the failure of the first screen. In response to detecting occurrence of the failure of the first screen, the control unit may enter a second mode which is sometimes also referred to as a reconfigured display mode.

For example, screens 30a and 30c of FIG. 4B may fail. In this example, only screen 30b is operational and all other screens 30a, 30c are non-operational. As another example, screen 30b of FIG. 4C may fail and only screen 30a remains operational.

If the first screen starts working again and the control unit detects that all screens 30 are operational, the control unit may return to the first mode or normal display mode.

Figure 5:
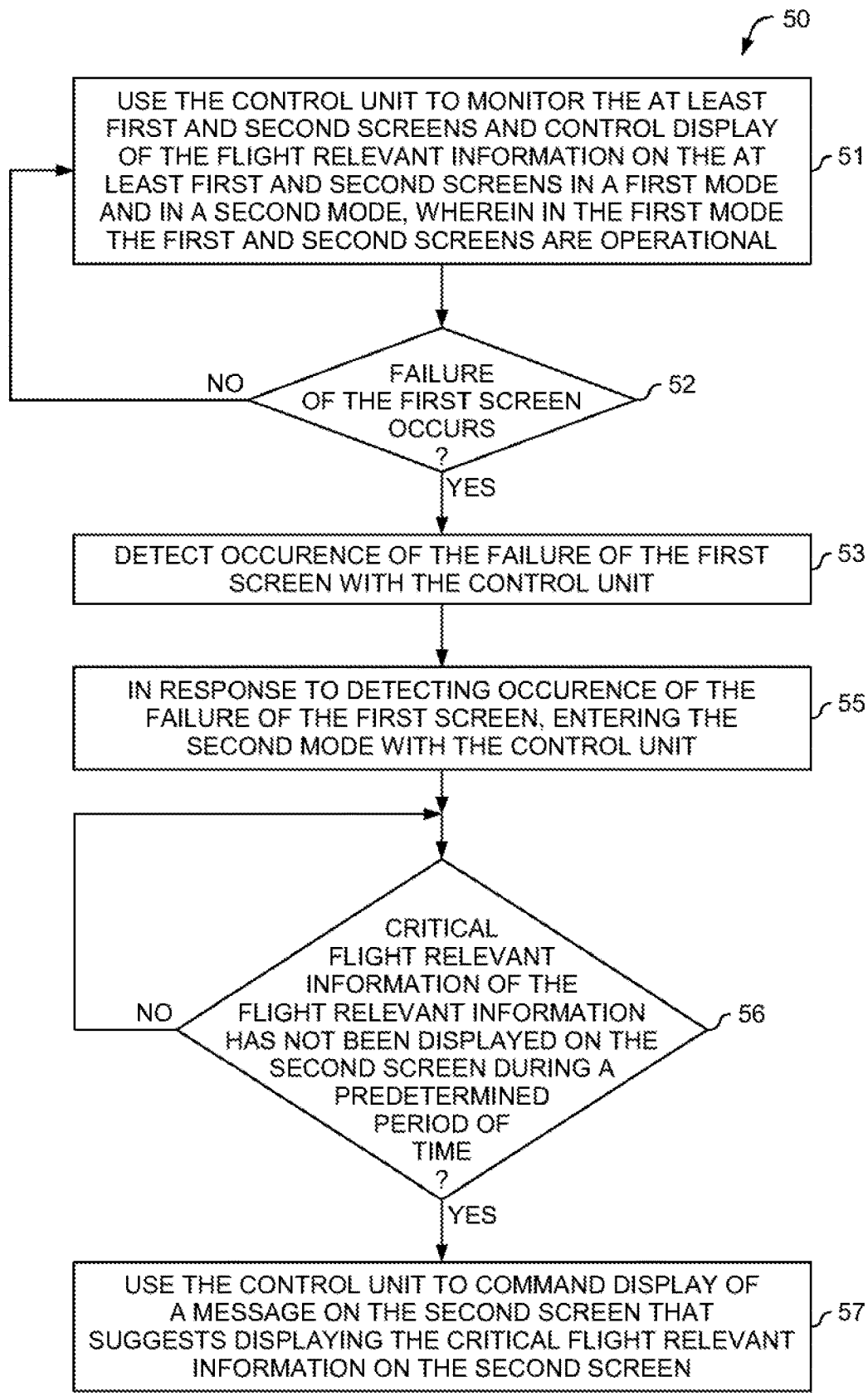
FIG. 5 is a diagram of an exemplary flowchart showing illustrative operations for operating, in an aircraft, a display system that comprises a control unit and at least a first and a second screen that are installed in a cockpit of the aircraft in accordance with some embodiments.

FIG. 5 is a diagram of an illustrative flowchart showing exemplary operations for operating, in an aircraft, a display system that comprises a control unit and at least a first and a second screen that are installed in a cockpit of the aircraft in accordance with some embodiments. As an example, a display system such as display system 20 with control unit 12 of FIG. 2 may perform operations 51, 52, 53, 55, 56, and 57 of method 50.

During operation 51, the display system may use the control unit to monitor the at least first and second screens and control display of the flight relevant information on the at least first and second screens in a first mode and in a second mode, wherein in the first mode the first and second screens are operational.

For example, control unit 12 of display system 20 of FIG. 2 may monitor screens 18 via connections 22. If desired, control unit 12 may control display of the flight relevant information on screens 16. If the monitored screens 18 are operational, control unit 12 operates in a first mode which is sometimes also referred to as a normal display mode.

During operation 52, the display system may observe whether failure of the first screen occurs. If no failure of the first screen occurs, the display system returns to operation 51.

If failure of the first screen occurs, the display system may detect occurrence of the failure of the first screen with the control unit during operation 53.

During operation 55, in response to detecting occurrence of the failure of the first screen, the display system may enter the second mode with the control unit. For example, control unit 12 of display system 20 of FIG. 2 may, upon detecting occurrence of a failure of a screen of screens 13, enter a second mode which is sometimes also referred to as a reconfigured display mode.

During operation 56, the display system may monitor whether critical flight relevant information of the flight relevant information has not been displayed on the second screen during a predetermined period of time.

If critical flight relevant information of the flight relevant information has not been displayed on the second screen during the predetermined period of time, the display system may use the control unit to command display of a message on the second screen that suggests displaying the critical flight relevant information on the second screen during operation 57.

For example, control unit 12 of display system 20 of FIG. 2 may run a timer for the predetermined period of time and detect whether control unit 12 has returned to the normal display mode or whether the critical flight relevant information has been displayed on the second screen during that time. If this is not the case, control, unit 12 may command display of a message on the second screen.

The message may be designed to draw the attention of the operator. For example, control unit 12 may display any combination of a display window with a different color than the remainder of the screen, a display window with text that has a different color than the text in other display windows, a display window that flashes, a display window with text that blinks, a display window that is placed in the center of the screen or in any other highly visible area, etc.

The operator, in particular a pilot of the aircraft, is thereby informed that he or she should change the display window on the second screen from displaying non-critical flight relevant information to displaying critical flight relevant information.

Figure 6A:
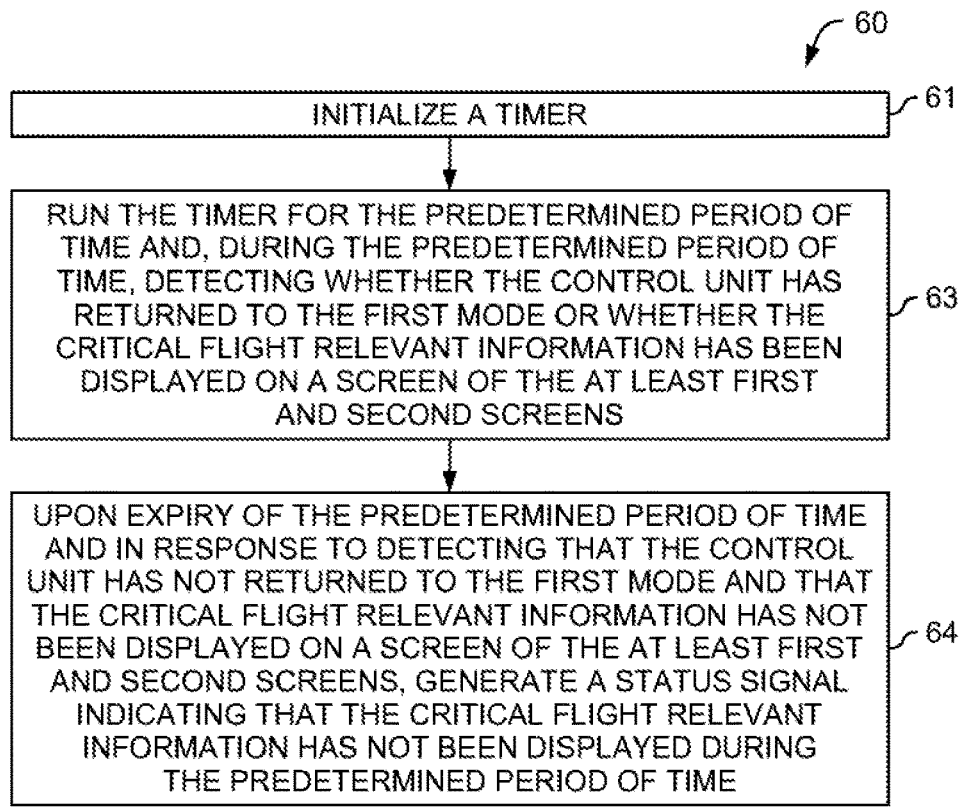
FIG. 6A is a diagram of a first exemplary flowchart showing illustrative operations for determining whether, after failure of a first screen has occurred, critical flight relevant information has not been displayed on a second screen during a predetermined period of time in accordance with some embodiments.

FIG. 6A is a diagram of a first exemplary flowchart showing illustrative operations for determining whether, after failure of the first screen has occurred, critical flight relevant information has not been displayed on the second screen during a predetermined period of time in accordance with some embodiments. As an example, a display system such as display system 20 with control unit 12 of FIG. 2 may perform operations 61, 63, and 64 of method 60.

During operation 61, the display system may initialize a timer. For example, control unit 12 of display system 20 of FIG. 2 may include a timer. The timer may be a countdown timer that is initialized at the predetermined period of time and counts down until reaching zero. If desired, the timer may be a stopwatch that starts at zero and counts up until reaching the predetermined period of time.

During operation 63, the display system may run the timer for the predetermined period of time and, during the predetermined period of time, detect whether the control unit has returned to the first mode or whether the critical flight relevant information has been displayed on a screen of the at least first and second screens.

For example, control unit 12 of display system 20 of FIG. 2 may monitor screens 18 via connections 22 while the timer is running. In particular, control unit 12 may monitor screens 18 to detect whether all screens have become operational again and, as a result, the control unit has returned to the first mode. Control unit 12 may also monitor screens 18 to detect whether the critical flight relevant information has been displayed on one of the still operating screens 18.

During operation 64, the display system may, upon expiry of the predetermined period of time and in response to detecting that the control unit has not returned to the first mode and that the critical flight relevant information has not been displayed on a screen of the at least first and second screens, generate a status signal indicating that the critical flight relevant information has not been displayed during the predetermined period of time.

For example, control unit 12 of display system 20 of FIG. 2 may not have detected during the predetermined period of time that all screens have become operational and may not have detected that the critical flight relevant information has been displayed on one of the still operating screens 18. If desired, display system 20 may generate a status signal that is indicative of a non-display of critical flight relevant information on any screen of the still operating screens 18.

In some embodiments, control unit 12 may command display of a message on the second screen that suggests displaying the critical flight relevant information on the second screen in response to the status signal.

Figure 6B:
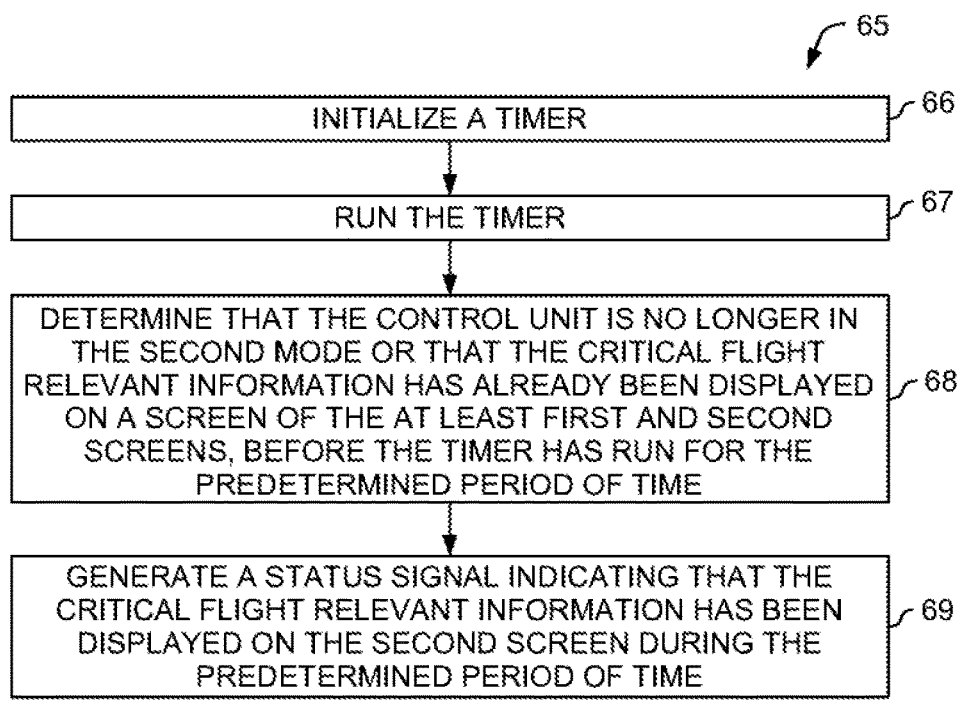
FIG. 6B is a diagram of a second exemplary flowchart showing illustrative operations for determining whether, after failure of a first, screen has occurred, critical flight, relevant information has not been displayed on a second screen during a predetermined period of time in accordance with some embodiments.

FIG. 6B is a diagram of a second exemplary flowchart showing illustrative operations for determining whether, after failure of the first screen has occurred, critical flight relevant information has not been displayed on the second screen during a predetermined period of time in accordance with some embodiments. As an example, a display system such as display system 20 with control unit 12 of FIG. 2 may perform operations 66, 67, 68, and 69 of method 65.

During operation 66, the display system may initialize a timer. For example, control unit 12 of display system 20 of FIG. 2 may include a timer. The timer may be a countdown timer that is initialized at the predetermined period of time and counts down until reaching zero. If desired, the timer may be a stopwatch that starts at zero and counts up until reaching the predetermined period of time.

During operation 67, the display system may run the timer. For example, control unit 12 of display system 20 of FIG. 2 may count down until reaching zero if the timer is a countdown timer or count up if the timer is a stopwatch.

During operation 68, the display system may determine that the control unit is no longer in the second mode or that the critical flight relevant information has already been displayed on a screen of the at least first and second screens, before the timer has run for the predetermined period of time.

For example, while control unit 12 of display system 20 of FIG. 2 counts up or down, control unit 12 may detect that all screens have become operational again or that the critical flight relevant information has been displayed on one of the still operating screens 18.

During operation 69, the display system may generate a status signal indicating that the critical flight relevant information has been displayed on the second screen during the predetermined period of time. If desired, display system 20 of FIG. 2 may generate a status signal that is indicative of a display of critical flight relevant information on any screen of the still operating screens 18.

Optionally the timer may be stopped as soon as the control unit detects a display of critical flight relevant information on any screen of the still operating screens.

Figure 7:
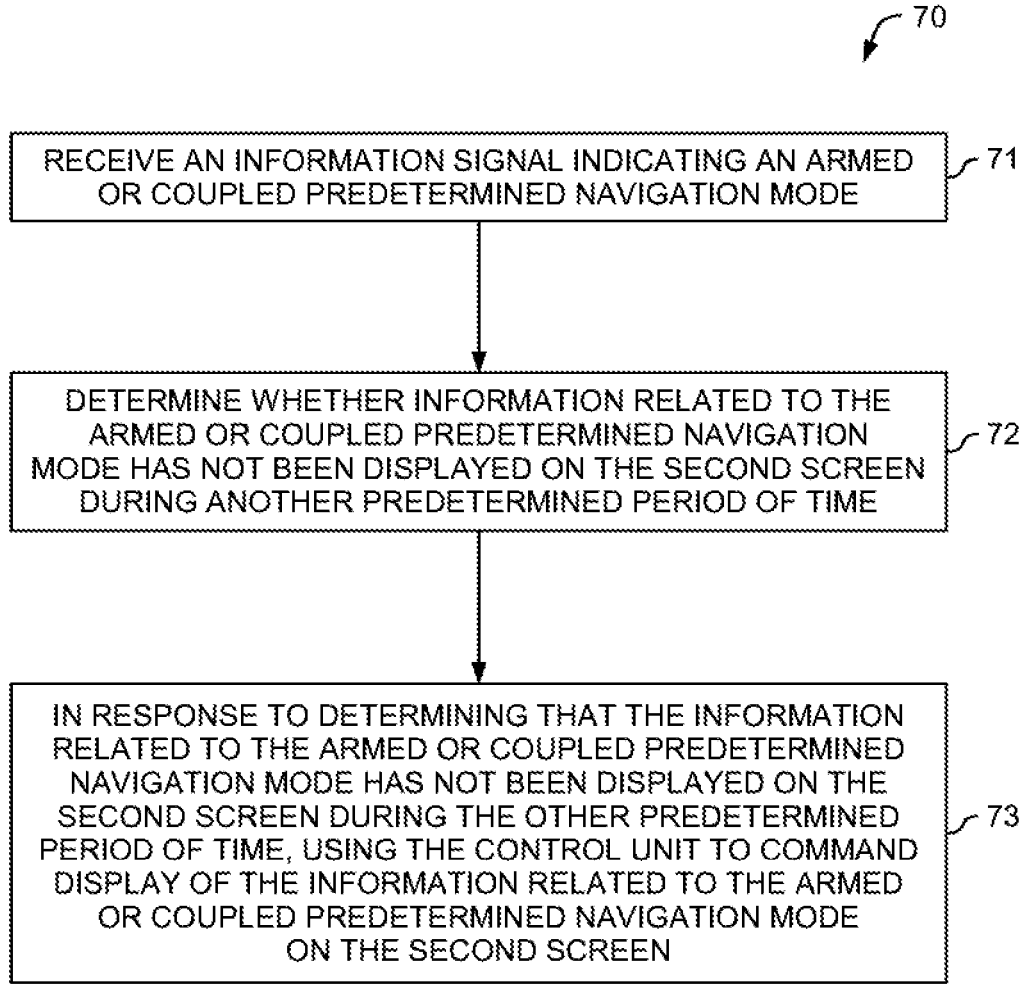
FIG. 7 is a diagram of an exemplary flowchart showing illustrative operations for commanding display of information related to an armed or coupled predetermined navigation mode on one screen after failure of at least one other screen in accordance with some embodiments.

FIG. 7 is a diagram of an exemplary flowchart showing illustrative operations for commanding display of information related to an armed or coupled predetermined navigation mode on one screen after failure of at least one other screen in accordance with some embodiments. As an example, a display system such as display system 20 with control unit 12 of FIG. 2 may perform operations 71, 72, and 73 of method 70.

During operation 71, the display system may receive an information signal indicating an armed or coupled predetermined navigation mode. For example, control unit 12 of display system 20 of FIG. 2 may receive a status signal from warning management system 16 over connection 26 that is indicative of an armed or coupled predetermined navigation mode.

Such a status signal may indicate that the automatic flight control system (AFCS), the flight management system (FMS), the VHF omni-directional range (VOR), the instrument landing system (ILS), and/or any other predetermined navigation mode is armed (i.e., turned on) and/or coupled (i.e., in connection with, a device that is not on board the aircraft, such as a terrestrial antenna).

During operation 72, the display system may determine whether information related to the armed or coupled predetermined navigation mode has not been displayed on the second screen during another predetermined period of time.

For example, flight regulations may impose that a display window associated with the predetermined navigation mode displays information related to the armed or coupled predetermined navigation mode on a screen of the display system. Consider further that in display system 20 of FIG. 2, the effect of an action on human-machine interface 14 replaces the display window associated with, the predetermined navigation mode that is displayed on a screen 18 of display system 20 with another display window of a type having a lower priority parameter in control unit 12 on that screen 18.

In other words, the second screen displays a display window that is associated with the predetermined navigation mode and the effect of an action on human-machine interface 14 replaces the display window that is associated with the predetermined navigation mode with a display window that is associated with non-critical flight relevant information on the second screen.

For example, control unit 12 of display system 20 of FIG. 2 may determine that the information that is associated with the armed or coupled predetermined navigation mode is no longer displayed on the second screen. If desired, control unit 12 may be configured to allow that the information that is associated with the armed or coupled predetermined navigation mode is not being displayed on the second screen for a predetermined period of time before the armed or coupled predetermined navigation mode has to be disarmed and/or decoupled.

During operation 73, the display system may, in response to determining that the information related to the armed or coupled predetermined navigation mode has not been displayed on the second screen during the other predetermined period of time, use the control unit to command display of the information related to the armed or coupled predetermined navigation mode on the second screen.

For example, control unit 12 of display system 20 of FIG. 2 may command display of the information related to the armed or coupled predetermined navigation mode on one of the still functioning screens 18 to avoid disarmament and/or decoupling of the armed or coupled predetermined navigation mode.

Figure 8:
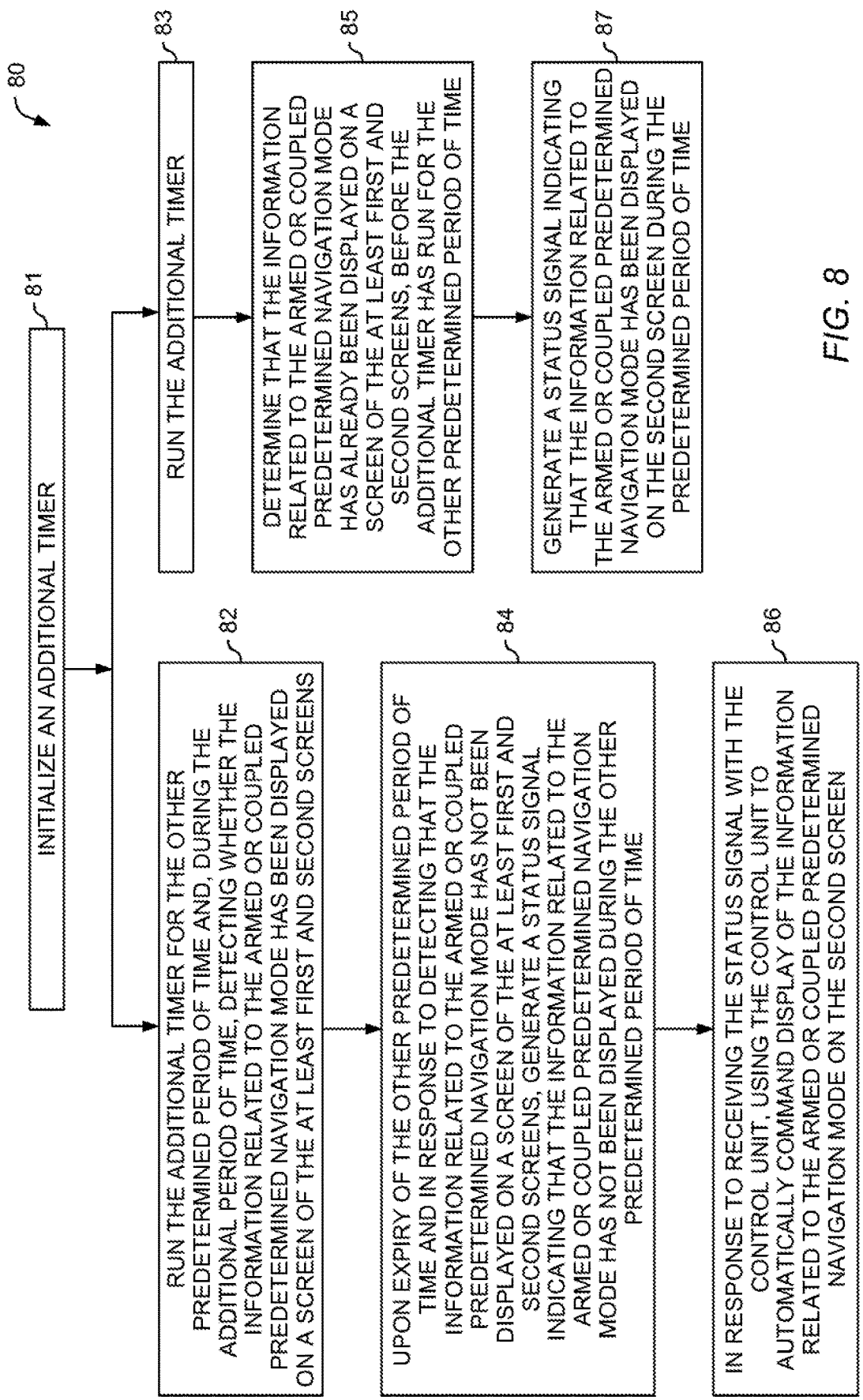
FIG. 8 is a diagram of an exemplary flowchart showing illustrative operations for determining whether, after failure of a first screen has occurred, information related to an armed or coupled predetermined navigation mode has not been displayed on a second screen during a predetermined period of time in accordance with some embodiments.

FIG. 8 is a diagram of an exemplary flowchart showing illustrative operations for determining whether, after failure of the first screen has occurred, the information related to the armed or coupled predetermined navigation mode has not been displayed on the second screen during another predetermined period of time in accordance with some embodiments. As an example, a display system such as display system 20 with control unit 12 of FIG. 2 may perform operations 81, 82, 83, 84, 85, 86, and 87 of method 80.

During operation 81, the display system may initialize an additional timer. For example, control unit 12 of display system 20 of FIG. 2 may include an additional timer. The additional timer may be a countdown timer that is initialized at a predetermined period of time and counts down until reaching zero. If desired, the timer may be a stopwatch that starts at zero and counts up until reaching the predetermined period of time.

During operation 82, the display system may run the additional timer for the other predetermined period of time and, during the additional period of time, detecting whether the information related to the armed or coupled predetermined navigation mode has been displayed on a screen of the at least first and second screens.

For example, control unit 12 of display system 20 of FIG. 2 may monitor screens 18 via connections 22 and detect whether the information related to the armed or coupled predetermined navigation mode has been displayed on one of the operational screens 18.

During operation 84, the display system may, upon expiry of the other predetermined period of time and in response to detecting that the information related to the armed or coupled predetermined navigation mode has not been displayed on a screen of the at least first and second screens, generate a status signal indicating that the information related to the armed or coupled predetermined navigation mode has not been displayed during the other predetermined period of time.

During operation 86, the display system may, in response to receiving the status signal with the control unit, use the control unit to automatically command display of the information related to the armed or coupled predetermined navigation mode on the second screen.

For example, control unit 12 of display system 20 of FIG. 2 may command display of the information related to the armed or coupled predetermined navigation mode on one of the operational screens 18.

During operation 83, the display system may run the additional timer. The display system may determine that the information related to the armed or coupled predetermined navigation mode has already been displayed on a screen of the at least first and second screens, before the additional timer has run for the other predetermined period of time during operation 85.

For example, control unit 12 of display system 20 of FIG. 2 may monitor screens 18 via connections 22 and determine that the information related to the armed or coupled predetermined navigation mode has already been displayed on one of the operational screens 18.

During operation 87, the display system may generate a status signal indicating that the information related to the armed or coupled predetermined navigation mode has been displayed on the second screen during the predetermined period of time.

It should be noted that the above described embodiments are merely described to illustrate possible realizations of the present invention, but not in order to restrict the present invention thereto. Instead, multiple modifications and variations of the described embodiments are possible and should, therefore, also be considered as being part of the invention.

By way of example, right crew stations 36 and left crew stations 37 of FIGS. 4A to 4C are each shown to have up to two screens 30a, 30b and 30c, 30d. However, right crew stations 36 and left crew stations may include a different number of screens. As an example, right crew stations 36 may have three screens, four screens, etc. or only one screen. Furthermore, the distinction between right and left crew stations 36, 37 of FIGS. 4A and 4B is arbitrary. If desired, left crew stations may have two screens while right crew stations have one, two, or no screens.

Furthermore, although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

REFERENCE LIST 1 aircraft
2 fuselage
2a compartment/cockpit
2b compartment/cabin, cargo compartment
3 door
12 control unit
14 human-machine interface
16 warning management system/flight warning system
18 display unit/screen
20 display system
22, 24, 26 connections
28 display management system, cockpit display system
30, 30a, 30b, 30c, 30d display surface
31 display area
33 message area
35 signaling area
36 right crew station
37 left crew station
50 flowchart
51, 53, 55, 57 operation
52, 54 decision
60, 65 flowchart
61, 63, 64, 66, 67, 68, 69 operation
70 flowchart
71, 72, 73 operation
80 flowchart
81, 82, 83, 84, 85, 86, 87 operation

What is claimed is:

1. A method for operating, in an aircraft, a display system that comprises a control unit and at least a first and a second screen that are installed in a cockpit of the aircraft, comprising:

using the control unit to monitor the at least first and second screens and control display of the flight relevant information on the at least first and second screens in a first mode and in a second mode, wherein in the first mode the first and second screens are operational;

if failure of the first screen occurs, detecting occurrence of the failure of the first screen with the control unit;

in response to detecting occurrence of the failure of the first screen, entering the second mode with the control unit;

wherein in the second mode, determining with the control unit whether a critical flight relevant information of the flight relevant information has not been displayed on the second screen during a predetermined period of time; and in response to determining with the control unit that the critical flight relevant information has not been displayed on the second screen during the predetermined period of time, using the control unit to command display of a message on the second screen that suggests displaying the critical flight relevant information on the second screen;

wherein determining whether the critical flight relevant information has not been displayed on the second screen during the predetermined period of the time further comprises:

initializing a timer; and running the timer for the predetermined period of time and, during the predetermined period of time, detecting whether the control unit has entered the first mode or whether the critical flight relevant information has been displayed on a screen of the at least first and second screens; and upon expiry of the predetermined period of time and in response to detecting that the control unit has not entered the first mode and that the critical flight relevant information has not been displayed on a screen of the at least first and second screens, generating a status signal indication that the critical flight relevant information has not been displayed during the predetermined period of time.

2. The method of claim 1, wherein in the second mode only the second screen is operational and all other screens of the at least first and second screens are non-operational.

3. A method for operating, in an aircraft, a display system that comprises a control unit and at least a first and a second screen that are installed in a cockpit of the aircraft, comprising:

using the control unit to monitor the at least first and second screens and control display of the flight relevant information on the at least first and second screens in a first mode and in a second mode, wherein in the first mode the first and second screens are operational;

if failure of the first screen occurs, detecting occurrence of the failure of the first screen with the control unit;

in response to detecting occurrence of the failure of the first screen, entering the second mode with the control unit;

wherein in the second mode, determining with the control unit whether a critical flight relevant information of the flight relevant information has not been displayed on the second screen during a predetermined period of time; and in response to determining with the control unit that the critical flight relevant information has not been displayed on the second screen during the predetermined period of time, using the control unit to command display of a message on the second screen that suggests displaying the critical flight relevant information on the second screen;

with the control unit, receiving an information signal indicating an armed or coupled predetermined navigation mode;

determining whether information related to the armed or coupled predetermined navigation mode has not been displayed on the second screen during another predetermined period of time; and in response to determining that the information related to the armed or coupled predetermined navigation mode has not been displayed on the second screen during the other predetermined period of time, using the control unit to command display of the information related to the armed or coupled predetermined navigation mode on the second screen;

wherein determining whether the information related to the armed or coupled predetermined navigation mode has not been displayed on the second screen during the other predetermined period of time further comprises initializing an additional timer;

running the additional timer for the other predetermined period of time and, during the other predetermined period of time, detecting whether the information related to the armed or coupled predetermined navigation mode has been displayed on a screen of the at least first and second screens;

upon expiry of the other predetermined period of time and in response to detecting that the information related to the armed or coupled predetermined navigation mode has not been displayed on a screen of the at least first and second screens, generating a status signal indicating that the information related to the armed or coupled predetermined navigation mode has not been displayed during the other predetermined period of time; and in response to receiving the status signal with the control unit, using the control unit to automatically command display of the information related to the armed or coupled predetermined navigation mode on the second screen.

4. The method of claim 3, wherein in the second mode only the second screen is operational and all other screens of the at least first and second screens are non-operational.

5. The method of claim 3, further comprising:

with the control unit, receiving an alert signal indicating an occurrence of a flight safety-critical event; and in response to receiving the alert signal, displaying information related to the flight safety-critical event on the second screen.

6. The method of claim 1, further comprising:

in response to determining that the control unit is no longer in the second mode or that the critical flight relevant information has already been displayed on a screen of the at least first and second screens, before the timer has run for the predetermined period of time, generating a status signal indicating that the critical flight relevant information has been displayed on the second screen during the predetermined period of time.

7. The method of claim 1, further comprising:

with the control unit, receiving an alert signal indicating an occurrence of a flight safety-critical event; and in response to receiving the alert signal, displaying information related to the flight safety-critical event on the second screen.

8. The method of claim 7, wherein the flight safety-critical event includes at least one of a first event that represents an immediate hazard to the safe operation of the aircraft or a second event that represents a potential future hazard to the safe operation of the aircraft.

9. The method of claim 1, further comprising:

with the control unit, receiving an information signal indicating an armed or coupled predetermined navigation mode;

determining whether information related to the armed or coupled predetermined navigation mode has not been displayed on the second screen during another predetermined period of time; and in response to determining that the information related to the armed or coupled predetermined navigation mode has not been displayed on the second screen during the other predetermined period of time, using the control unit to command display of the information related to the armed or coupled predetermined navigation mode on the second screen.

10. The method of claim 9, wherein the armed or coupled predetermined navigation mode comprises at least one of an armed or coupled automatic flight control system, an armed or coupled flight management system, an armed or coupled very high frequency omni-directional range system, or an armed or coupled instrument landing system.

11. The method of claim 9, wherein determining whether the information related to the armed or coupled predetermined navigation mode has not been displayed on the second screen during the other predetermined period of time further comprises:
initializing an additional timer.

12. The method of claim 11, further comprising:
running the additional timer for the other predetermined period of time and, during the other predetermined period of time, detecting whether the information related to the armed or coupled predetermined navigation mode has been displayed on a screen of the at least first and second screens;
upon expiry of the other predetermined period of time and in response to detecting that the information related to the armed or coupled predetermined navigation mode has not been displayed on a screen of the at least first and second screens, generating a status signal indicating that the information related to the armed or coupled predetermined navigation mode has not been displayed during the other predetermined period of time; and
in response to receiving the status signal with the control unit, using the control unit to automatically command display of the information related to the armed or coupled predetermined navigation mode on the second screen.

13. The method of claim 11, further comprising:
running the additional timer;
determining that the information related to the armed or coupled predetermined navigation mode has already been displayed on a screen of the at least first and second screens, before the additional timer has run for the other predetermined period of time; and
generating a status signal indicating that the information related to the armed or coupled predetermined navigation mode has been displayed on the second screen during the other predetermined period of time.

14. The method of claim 1, further comprising:
commanding display of information related to either one of two redundant instrument landing systems on the second screen.

15. A display system in an aircraft adapted to perform the method of claim 1, comprising:
at least a first and a second screen that are installed in a cockpit of the aircraft; and
a control unit that monitors the at least first and second screens and controls display of the flight relevant information on the at least first and second screens in a first mode and in a second mode, wherein in the first mode the first and second screens are operational, and wherein the control unit enters the second mode upon detecting occurrence of a failure of the first screen, wherein
in the second mode, the control unit commands the second screen to display a message that suggests a switch from displaying a first non-critical flight relevant information of the flight relevant information on the second screen to displaying a first critical flight relevant information of the flight relevant information on the second screen, if the first critical flight relevant information has not been displayed on the second screen during a predetermined period of time.

16. A method for operating, in an aircraft, a display system that comprises a control unit and at least a first and a second screen that are installed in a cockpit of the aircraft, comprising:
using the control unit to monitor the at least first and second screens and control display of the flight relevant information on the at least first and second screens in a first mode and in a second mode, wherein in the first mode the first and second screens are operational;
if failure of the first screen occurs, detecting occurrence of the failure of the first screen with the control unit;
in response to detecting occurrence of the failure of the first screen, entering the second mode with the control unit;
wherein
in the second mode, determining with the control unit whether a critical flight relevant information of the flight relevant information has not been displayed on the second screen during a predetermined period of time; and
in response to determining with the control unit that the critical flight relevant information has not been displayed on the second screen during the predetermined period of time, using the control unit to command display of a message on the second screen that suggests displaying the critical flight relevant information on the second screen;
wherein determining whether the critical flight relevant information has not been displayed on the second screen during the predetermined period of time further comprises initializing a timer;
running the timer;
determining whether the control unit is no longer in the second mode or whether the critical flight relevant information has already been displayed on a screen of the at least first and second screens, before the timer has run for the predetermined period of time; and
in response to determining that the control unit is no longer in the second mode or that the critical flight relevant information has already been displayed on a screen of the at least first and second screens, before the timer has run for the predetermined period of time, generating a status signal indicating that the critical flight relevant information has been displayed on the second screen during the predetermined period of time.

17. The method of claim 16, wherein in the second mode only the second screen is operational and all other screens of the at least first and second screens are non-operational.

18. The method of claim 16, further comprising:
with the control unit, receiving an alert signal indicating an occurrence of a flight safety-critical event; and
in response to receiving the alert signal, displaying information related to the flight safety-critical event on the second screen.

19. The method of claim 18, wherein the flight safety-critical event includes at least one of a first event that represents an immediate hazard to the safe operation of the aircraft or a second event that represents a potential future hazard to the safe operation of the aircraft.

20. The method of claim 5, wherein the flight safety-critical event includes at least one of a first event that represents an immediate hazard to the safe operation of the aircraft or a second event that represents a potential future hazard to the safe operation of the aircraft.

* * * * *